United States Patent [19]

Cohen

[11] Patent Number: 4,741,108

[45] Date of Patent: May 3, 1988

[54] MEASUREMENT SYSTEM

[75] Inventor: Robert M. Cohen, Rockville, Md.

[73] Assignee: Logistics Data Systems, Inc., Irving, Tex.

[21] Appl. No.: 808,746

[22] Filed: Dec. 13, 1985

[51] Int. Cl.⁴ .............................................. G01B 7/12
[52] U.S. Cl. ............................ 33/143 L; 33/143 M
[58] Field of Search ............... 33/143 L, 1 P, 143 M, 33/147 N, 148 H, 178 R, 178 D

[56] References Cited

U.S. PATENT DOCUMENTS

| | | | |
|---|---|---|---|
| 1,424,492 | 8/1922 | Leschen | 33/143 M |
| 1,555,792 | 9/1925 | Souder | 33/143 R |
| 1,644,033 | 10/1927 | Rathbun | 33/143 R |
| 1,666,934 | 4/1928 | Haywood | 33/143 R |
| 2,551,671 | 5/1951 | Harris | 33/143 M |
| 2,807,880 | 10/1957 | Darmody | 33/147 R |
| 3,016,618 | 1/1962 | Speed et al. | 33/158 |
| 3,095,651 | 7/1963 | Luedicke, Jr. | 33/158 |
| 3,296,704 | 1/1967 | Zajkowski | 33/143 R |
| 3,414,978 | 12/1968 | Prow | 33/143 L |
| 3,550,279 | 12/1970 | Fapiano | 33/143 L |
| 4,008,523 | 2/1977 | Von Voros | 33/143 L |
| 4,435,904 | 3/1984 | Logan et al. | 33/143 L |

FOREIGN PATENT DOCUMENTS

| | | | |
|---|---|---|---|
| 667390 | 7/1965 | Belgium . | |
| 1216552 | 5/1966 | Fed. Rep. of Germany . | |
| 63775 | 5/1980 | Japan | 33/1 P |
| 139610 | 8/1982 | Japan | 33/143 L |

*Primary Examiner*—Willis Little
*Attorney, Agent, or Firm*—Saidman, Sterne, Kessler & Goldstein

[57] ABSTRACT

An apparatus for accurately measuring a variety of objects of disparate shape, having a substantially flat plate-like stationary member fixed to a base member and second, substantially flat plate-like movable member facing the surface of the first member and mounted for movement toward and away from the first member. The opposing plate-like surfaces of the first and second members are maintained substantially in parallel with each other and are dimensioned to make contact with the outermost surface part of an object to be measured in a given orientation of the object. Means are provided for accurately measuring the distance between the plate-like surfaces when an object is placed between the first and second members. The movable member is normally biased for movement toward the fixed member.

11 Claims, 3 Drawing Sheets

MEASUREMENT SYSTEM

FIELD OF THE INVENTION

This invention relates to automated measurement systems. More particularly, the invention relates to an electronic object measuring caliper, particularly adapted to measurements of oddly-shaped objects, which in the preferred embodiment is connected to computer means for correlating measurement data with object identification data.

BACKGROUND OF THE INVENTION

There are many situations in which accurate, fast and fool-proof measurement of objects of disparate size is desired. In many of these applications it would furthermore be desirable to correlate the measurement of the object with identification thereof. This invention is directed at such measurement instruments and systems.

One example of a situation in which a fast and accurate product measurement system, preferably with associated data reporting system, would be desirable is found in modern grocery retailing operations. It will be appreciated that it is important to the retailer as well as to the wholesaler of goods to determine the shelf space to be given to a particular manufacturer's product or product line.

There is a chronic need in many segments of the retailing industry to be able to accurately measure product dimensions. Shelf space management is an essential part of retail marketing operations where shelf space is a consideration, such as in the food industry. Retailers who rely on displaying products on shelves are constrained by the total amount of shelf space available to them. This is a function of the size of the store and the arrangement of the shelves within the store. In order to maximize profitability and minimize inventory, retailers would like to be able to stock as much product on the shelves and store as little product in the "back room" as possible. For a building of a given size this permits a maximum amount of space to be utilized as sales space and a minimum amount as inventory storage space. A device and system for determining the amount of shelf space to be assigned to given goods, on the part of the retailer, and measurement of the actual amount of space given to goods, on the part of the wholesaler, is of great interest. A need thus exists in the art for a measurement system which can enable such shelf-space determinations to be made quickly and accurately, and which will provide data of high integrity in a cost- and time-efficient manner.

The amount of shelf space a particular product occupies is a function of the outside dimensions of its package and of the orientation of the package with respect to the shelf. To determine the maximum dimension of the package with respect to a given orientation, it is desired that a simple and accurate device be provided which measures the actual outside dimension of the package. Note that it is the maximum outside dimension which must be measured, not merely the outside dimension of most of the package. For example, the spacing of cans on a shelf is determined by the outside dimension of the bead or rim around the can ends. Any measuring device to be useful in this environment must measure the can over the bead, not merely measure the diameter of the body of the can.

In particular, in order to accommodate the retailer's desire to make the most efficient use of shelf space, a number of companies have developed techniques for providing shelf space management assistance to the retailers. Examples of shelf space management systems currently available are the SPACEMAN TM and SPACEMAN II TM software programs developed by Logistics Data Systems. These programs are capable of graphically displaying optimum shelf space configurations for products of various sizes and shapes.

One thing which these sophisticated shelf space management systems need is input information about the size of each product. It is important to know the "worst case" dimensions. As mentioned, for example, cans have lips at the joinder of the side with the can top or bottom. These lips protrude outwardly and/or upwardly; thus a measurement taken at some position along the can side will be smaller than a measurement taken across the lip. Another example would be a box of powdered products such as laundry detergent, having a retractable pour spout on the side. Even in the closed position, the pour spout creates a slight bulge which will affect product space requirements.

In order to properly manage shelf space, it is important to know the largest package dimensions, which, not uncommonly, are the most difficult to measure. It is also important to be able to make the necessary measurements quickly. A further criterion is that a minimum of skill be required on the part of the person making the measurements.

For simplicity in processing, it would be desirable to electronically record the measurement as it is made. This will save operator time and reduce the likelihood of operator error.

It may also be desirable to provide a ready means of inputting data indicative of the number of identical products on the shelf, and a means of recording information identifying the contents of the can, such as the manufacturer and product names, so as to enable complete and accurate shelf space information to be gathered without undue effort on the part of the operator.

It is therefore an object of the invention to provide an improved measurement system which provides an electronically communicable output indicative of the size of the object being measured.

A further object is to provide an improved measurement system in combination with means for generating an electronically communicable identification of the product itself, with means for operator input of the number of identical products in a row, and with means for correlating these data items.

Additional objects and features will become apparent to persons skilled in the art from the following description of the preferred embodiments of the invention.

SUMMARY OF THE INVENTION

This invention concerns an apparatus for accurately measuring a variety of objects of disparate shape. A stationary member having a substantially flat plate-like surface is fixed to a base member. A second, movable member also having a substantially flat plate-like surface facing the surface of the first member is mounted on the base member for movement toward and away from the first member. The opposing plate-like surfaces of the first and second members are maintained substantially in parallel with each other and are dimensioned to make contact with the outermost surface part of an object to be measured in a given orientation of the object. Means are provided for accurately measuring the distance between the plate-like surfaces when an object is placed between the first and second members. The movable member is normally biased for movement toward the fixed member. A handle is provided for grasping the movable member and urging it in the opposite direction to open the plates for inserting an object to be measured. This device may be adapted to communicate data concerning the product size to a computer when used in a complete system which may also include devices for inputting product identification and number of package data.

BRIEF DESCRIPTION OF THE DRAWINGS

The invention will be better understood if reference is made to the accompanying drawings, in which.

DESCRIPTION OF THE PREFERRED EMBODIMENTS

Figure 1:
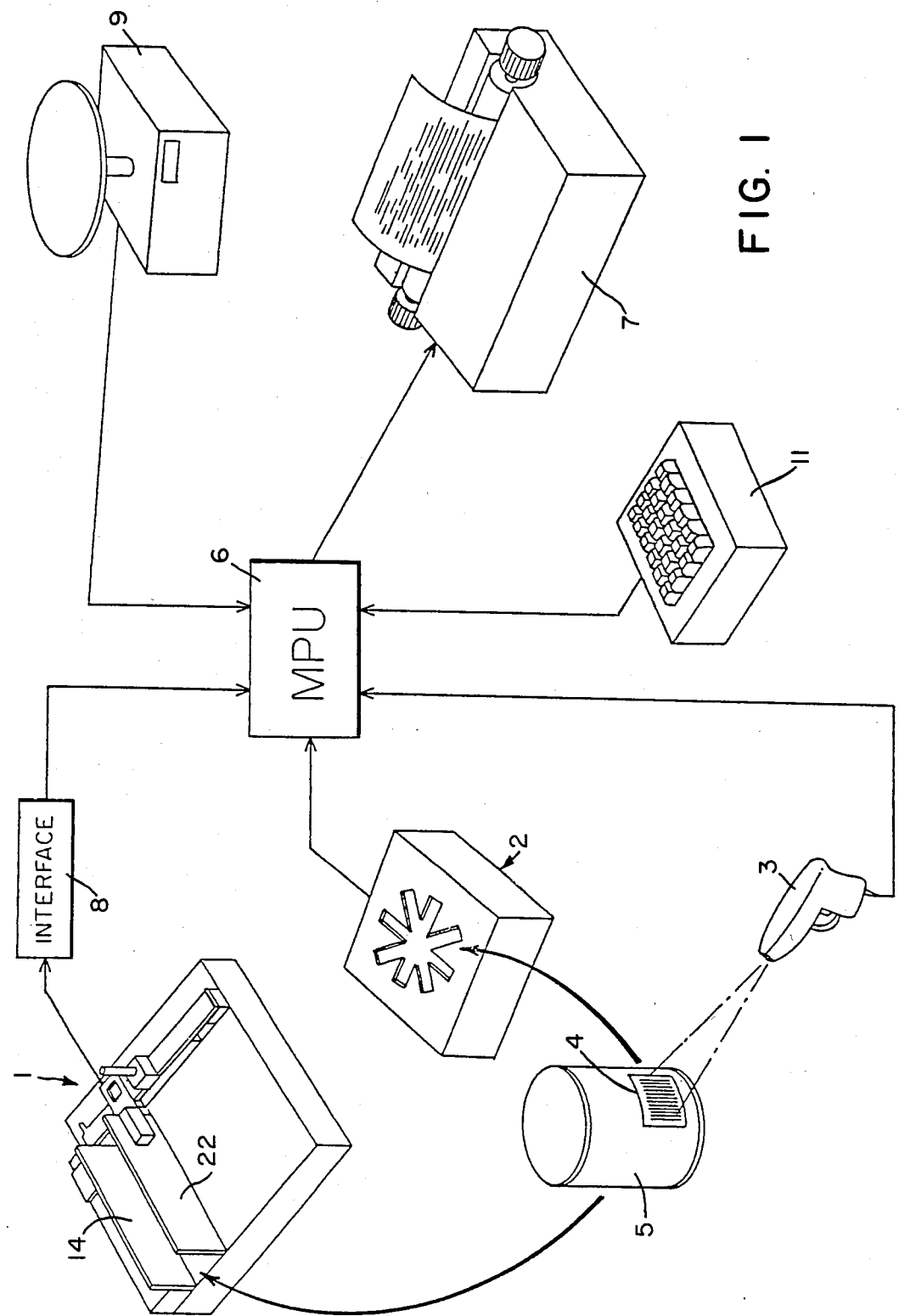
FIG. 1 shows an overview of the system according to the invention.

As mentioned above, this invention is particularly useful for making quick, accurate measurements of disparate products, such as are found on grocery store shelves. It may also be used in a wide variety of additional applications where it is advantageous to electronically generate and correlate data concerning dimensions or other characteristics of a physical object and identification of the object. FIG. 1 shows a system for achieving this goal.

The basic element of the system shown in FIG. 1 is a measuring device 1 which generates an electronically-transmissible signal indicative of the dimensions of an object 5 located between two parallel measuring anvils 14 and 22. The structure of measuring device 1 is detailed below in connection with FIGS. 2 and 3. Signals generated by the measuring device are passed via interface 8 to a microprocessor or computer 6.

In a comprehensive system, product identification is also supplied to the computer 6. The product identification data can be generated by a conventional point of sale universal product code (UPC) reader 2 or a hand held bar code reader 3. Both these devices read bar code data 4 on the package 5, the dimensions of which are measured by the measurement device 1. In either case the signals generated by either the UPC reader 2 or the bar code reader 3 are supplied to the computer 6, which is programmed to correlate product identification data received from either UPC reader 2 or bar code reader 3, with measurement data obtained from the measurement device 1. The computer 6 can be controlled in a manner well known to the art to provide a printed report from a conventional computer printer 7. The data communications and processing required for implementation of the system shown in FIG. 1 are within the skill of the prior art.

In some embodiments, a keypad device 11 may be incorporated as well. For example, a grocery inventory clerk may first measure a single 10-ounce can of soup. If there are fifty rows of cans of soup of the same manufacturer's, and if it is not desirable to individually correlate the individual types of soup, it will be adequate and much faster to simply measure one can, input the manufacturer's identification from the bar code 4, count the number of rows of cans of that manufacturer, and input that number via keypad 11. The computer 6 can then make the required calculations and correlations.

In other embodiments it may be desirable to input other product quality data. A wide variety of devices which measure physical qualities other than length, e.g. temperature, weight, radioactivity, color, clarity, and the like, are available which output signals that can be communicated to a computer. An electronic scale 9 is shown in FIG. 1 as indicative of this class of device.

Figure 2:
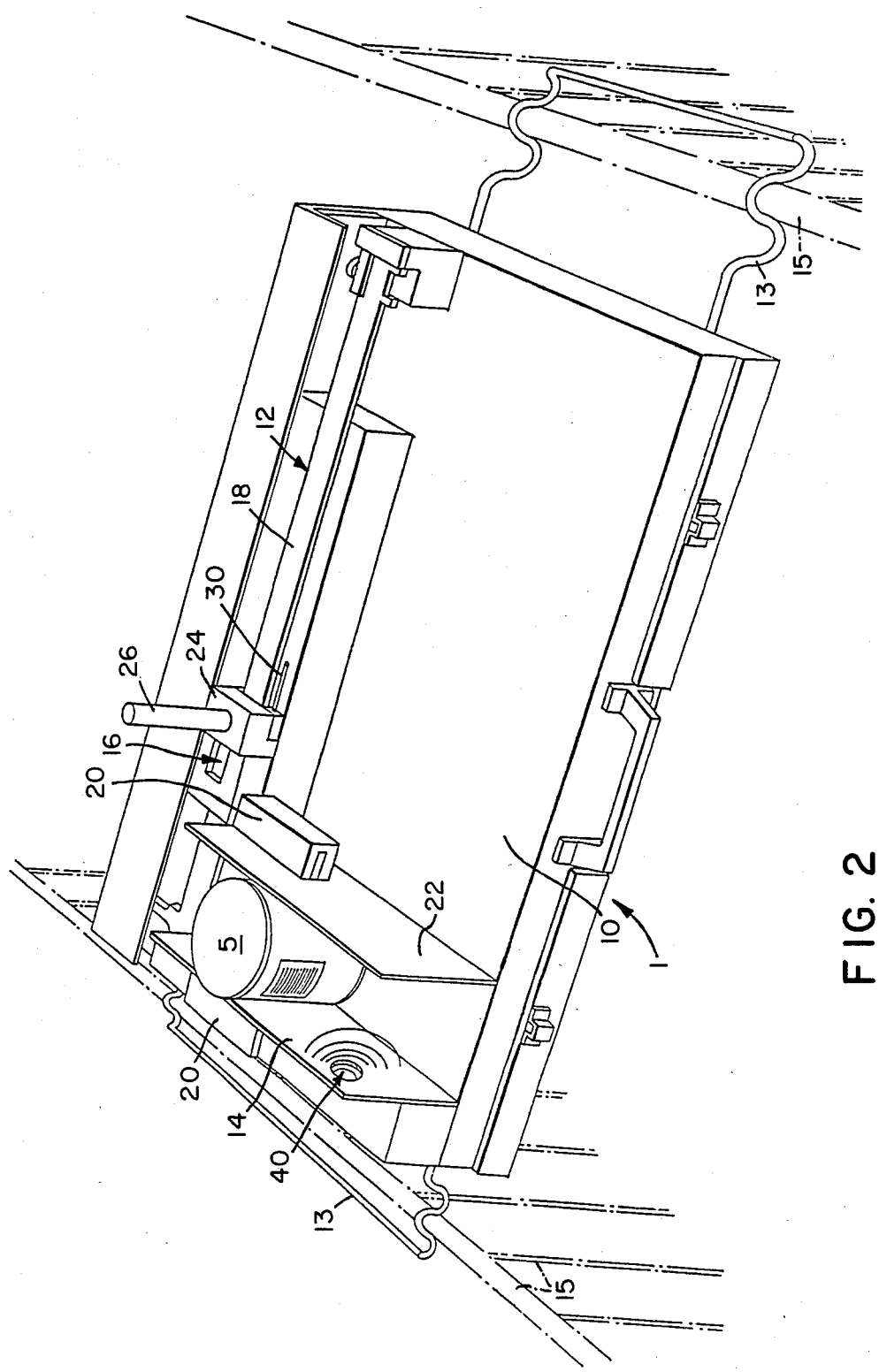
FIG. 2 shows an overview of the measuring device of the invention.

FIG. 2 shows additional details of the electronic measurement device 1 of FIG. 1. Two parallel anvils or plates 14 and 22 are shown as connected by means of blocks 20 to the two jaws of a digital caliper, indicated generally at 12. The caliper 12 has an extended rail 18 and a digital readout 16, which provides a user-readable number indicative of the spacing of the jaws from one another. Digital calipers which output signals suitable for transmission to a computer by way of a conventional interface are commercially available at the present time.

The caliper 12 is mounted on a base 10, which may be provided with support means 13 for affixing it to, for example, a conventional shopping cart indicated at 15 for convenience of use in the supermarket environment.

Attachment of the anvils 14 and 22 to the jaws of the caliper 12 in a true and parallel manner is critical if the measurement is to be an accurate one. Preferably, and as shown in FIG. 2, a handle 26 may be provided for operator convenience. Handle 26 is connected to the moving jaw of the caliper by means of a block 24 which is affixed by one or more screws to the moving jaw. As mentioned, the caliper 12 is carried by a base 10, to which the stationary jaw and anvil 14 are permanently fixed by any convenient means. The base 10 may then be enclosed in a briefcase or the like.

In use, the operator simply draws the handle 26 rightwardly so as to space the moving anvil 22 a distance from the stationary anvil 14 sufficient for the object 5 to be inserted therebetween. He then moves the moving anvil 22 into firm contact with the object 5, confining it against the stationary anvil 14. The dimension of the object between the plates can then be read directly from digital readout 16. Digital calipers which convert this operator-readable indication of the object dimension into a machine readable version thereof and electronically communicate the same by any conventional protocol to a programmable microprocessor or the equivalent are commercially available.

In a particularly preferred embodiment, the distance between plates 14 and 22 is measured by an ultrasonic source and detector, emitting a sonic pulse at, e.g. 20 kHz from the vicinity of the fixed anvil and detecting its return after reflection from the moving anvil, and calculating the distance between the plates or anvils in response to the time lag. Such a device could very easily be interfaced to a computer; in fact the microprocessor comprised by the computer 6 could be programmed to control the ultrasonic transducer (indicated at 40) and to perform the required calculation.

Figure 3:
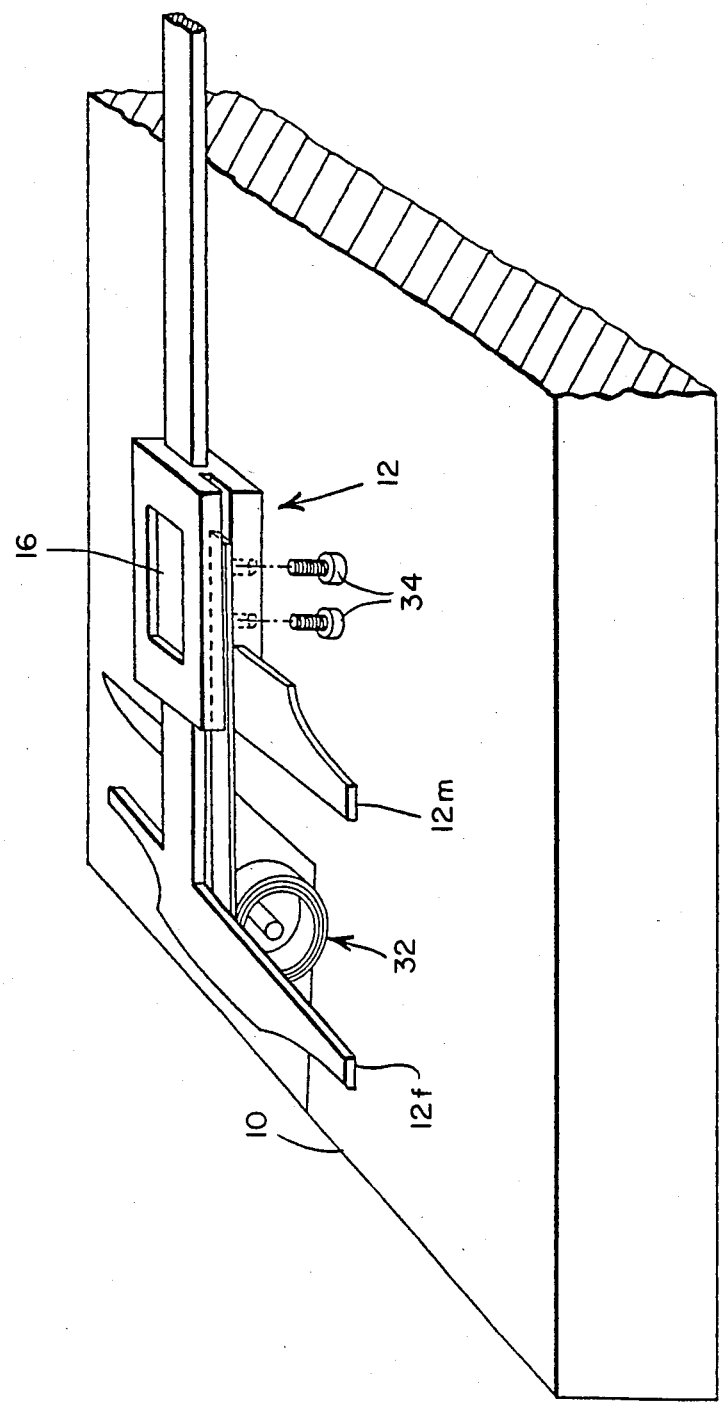
FIG. 3 shows in detail a portion of the measuring device of the invention.

FIG. 3 shows additional details of a preferred embodiment of the invention. The fixed and movable anvils 14 and 22 are not shown for clarity. In this way, fixed jaw 12f and moving jaw 12m of caliper 12 can be seen. In this embodiment of the invention, a roll spring 32 is affixed to the base member 10. Its free end is affixed by screws 34 to the underside of the moving jaw 12m of the caliper 12. In this way, the operator need merely move the movable jaw 12m rightwardly far enough to insert the object to be measured between the jaws and release the movable jaw 12m. The roll spring 32 will then pull the jaws into engagement with the object with a force (e.g., approximately 0.3–0.75 oz.) sufficient to ensure a correct reading. A roll spring 32 is used in preference to an extension spring because the spring force exerted by a roll spring does not vary with the distance the spring is extended. In this way, the force is similar regardless of the spacing of the jaws of the caliper 12.

A number of modifications to and variations on the embodiment of the invention described above will no doubt occur to those skilled in the art. A wide variety of devices which measure physical characteristics of objects are suitable for use in connection with the present invention, and would provide great convenience and flexibility in, for example, inventory operations; the only requirement is that they be conveniently operated and be conveniently interfaceable to a digital computer. Similarly, a wide variety of physical implementations of the device can be envisioned; it might be useful to have the entire system, including the product identification device and the computer mounted within a single sealable case so as to be easily transportable from place to place. This would simplify set up, which would be helpful, for example, to wholesalers, who may wish to go from store to store to check the shelf space being allotted to the lines they represent. Therefore, while a preferred embodiment of the invention has been described above, the above disclosure is not to be considered as a limitation on the invention, which is to be measured only by the following claims.

We claim:

1. Apparatus for accurately measuring a variety of objects of disparate shape and reliably correlating measurements with corresponding objects, comprising:
   a substantially planar base member;
   a first stationary measurement defining member fixed to said base member and having a substantially flat enlarged plate-like surface;
   a second, movable measurement defining member having a substantially flat enlarged plate-like surface facing and parallel to the plate-like surface of said first measurement defining member;
   said plate-like members being disposed substantially perpendicularly to said planar base member;
   the dimensions of each plate-like surface being greater than the largest dimension of an object to be measured, such that said plate-like surfaces make contact with the outermost surface of an object in a given orientation of the object to be measured;
   means for moving said second measurement defining member toward and away from said first measurement defining member while maintaining the plate-like surfaces of said first and second members parallel to each other and perpendicular to said base member;
   means for measuring the distance between said plate-like surfaces when an object is placed on said base member between said first and second members and said plate-like surfaces are in abutting contact with said object;
   means for providing first electronically transmissible data indicative of the distance between said plate-like members, said first electronically transmissible data comprising product measurement data;
   means for generating second electronically transmissible data identifying the object measured, said second electronically transmissible data comprising product identification data; and
   means for correlating and storing the product identification data and product measurement data.

2. Apparatus acording to claim 1, further comprising:
   a guide track fixed to said base member and coupled to said second plate-like member, for permitting movement of said second member relative to said first member while maintaining said first and second plate-like surfaces parallel to one another; and
   bias means coupled to said second member for normally urging said second member in the direction of said first member.

3. Apparatus according to claim 2, further comprising a manually graspable handle mounted to said means movable along said guide track for manually controlling movement of said second plate-like surface toward and away from said first plate-like surface.

4. Apparatus according to claim 3, wherein said measuring means includes means for detecting the position of said movable member along said guide track relative to a fixed reference on said guide track.

5. Apparatus according to claim 3, wherein said measuring means includes transducer means for directing signals having a frequency above about 20 kHz between said plate-like members and measuring the distance between the plate-like members as a function of the time of detection of a reflected return signal.

6. Apparatus according to claim 5, wherein said signals are ultrasonic in nature.

7. The apparatus of claim 3 in combination with case means for enclosing said first and second measurement defining members.

8. The apparatus of claim 3, further comprising support means for supporting said apparatus in a supermarket shopping cart.

9. The system of claim 1 wherein said means for correlating and storing the product identification data with product measurement data comprises computer means for receiving said product identification data and said product measurement data.

10. The system of claim 1 wherein said means for providing product identification data is means for reading machinereadable indicia on said product.

11. The apparatus of claim 1, further comprising means for inputting quantity information relating to the objects to be measured.

* * * * *